United States Patent [19]
Kleinberg

[11] Patent Number: 5,876,059
[45] Date of Patent: *Mar. 2, 1999

[54] VEHICLE SLEEPER BUNK RESTRAINT SYSTEM

[75] Inventor: Raymond Kleinberg, Sterling Heights, Mich.

[73] Assignee: Breed Automotive Technology, Inc., Lakeland, Fla.

[ * ] Notice: The term of this patent shall not extend beyond the expiration date of Pat. No. 5,690,355.

[21] Appl. No.: 977,100

[22] Filed: Nov. 24, 1997

Related U.S. Application Data

[62] Division of Ser. No. 763,176, Dec. 10, 1996, Pat. No. 5,690,355.

[51] Int. Cl.$^6$ ............................................. B60R 21/22
[52] U.S. Cl. ..................... 280/730.1; 280/749; 105/316
[58] Field of Search ........................ 280/730.1, 749; 296/35.2; 244/121; 105/316, 321

[56] References Cited

U.S. PATENT DOCUMENTS

| | | | |
|---|---|---|---|
| 3,603,535 | 9/1971 | DePolo | 244/121 |
| 3,650,223 | 3/1972 | Kobori | 108/44 |
| 4,421,342 | 12/1983 | Brown | 280/740 |
| 5,026,006 | 6/1991 | Tinder et al. | 244/122 AG |
| 5,375,879 | 12/1994 | Williams | 280/749 |
| 5,458,367 | 10/1995 | Marts et al. | 280/750.1 |
| 5,529,341 | 6/1996 | Hartigan | 280/749 |
| 5,536,042 | 7/1996 | Williams | 280/749 |

FOREIGN PATENT DOCUMENTS 196 03 104 C   3/1997   Germany .

*Primary Examiner*—Christopher P. Ellis
*Attorney, Agent, or Firm*—Markell Seitzman

[57] ABSTRACT

An occupant restraint system for vehicles with a sleeping compartment or bunk area, which uses airbags installed above and in front of the occupant of the bunk area to provide restraint and secondary collision protection during crashes and rollovers and other emergency conditions. A shelf assembly above the bunk is described, containing the airbag modules installed internal to the shelf. The covering of the shelf is such that deployment of the airbags would occur through the bottom cover, providing protection to the reclining occupant during crashes and rollovers. The shelf assembly containing the airbag modules has a fabric or mesh curtain connecting the front of the shelf to the lower bunk to restrict forward occupant motion during rapid deceleration, to provide privacy for the occupant and to secure the hinged movement of the upper shelf. This curtain can be replaced with a movable rigid padded wall section with or without complementary airbags to provide these same functions, and which can be stowed in a pocket compartment of the bunk assembly.

16 Claims, 6 Drawing Sheets

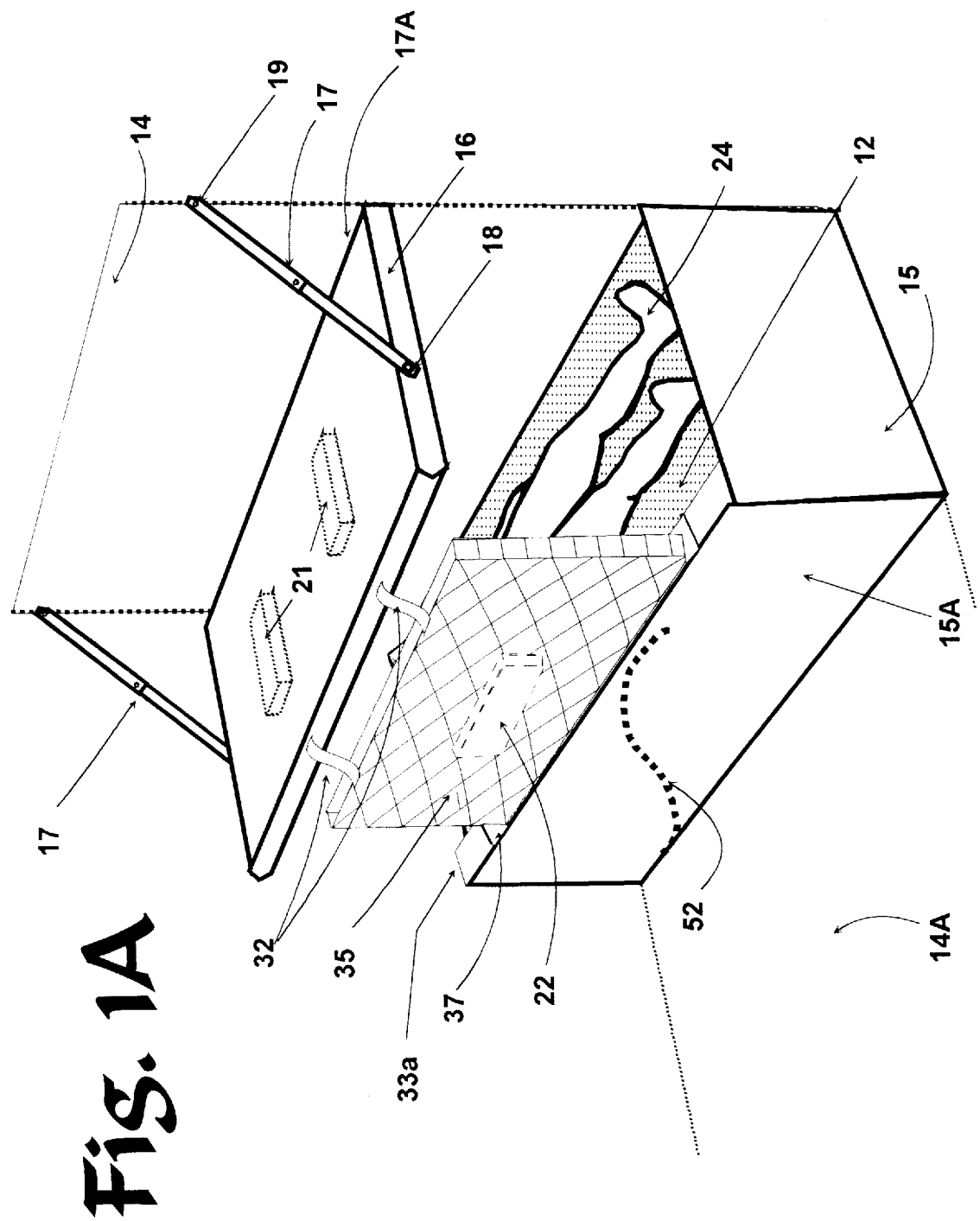

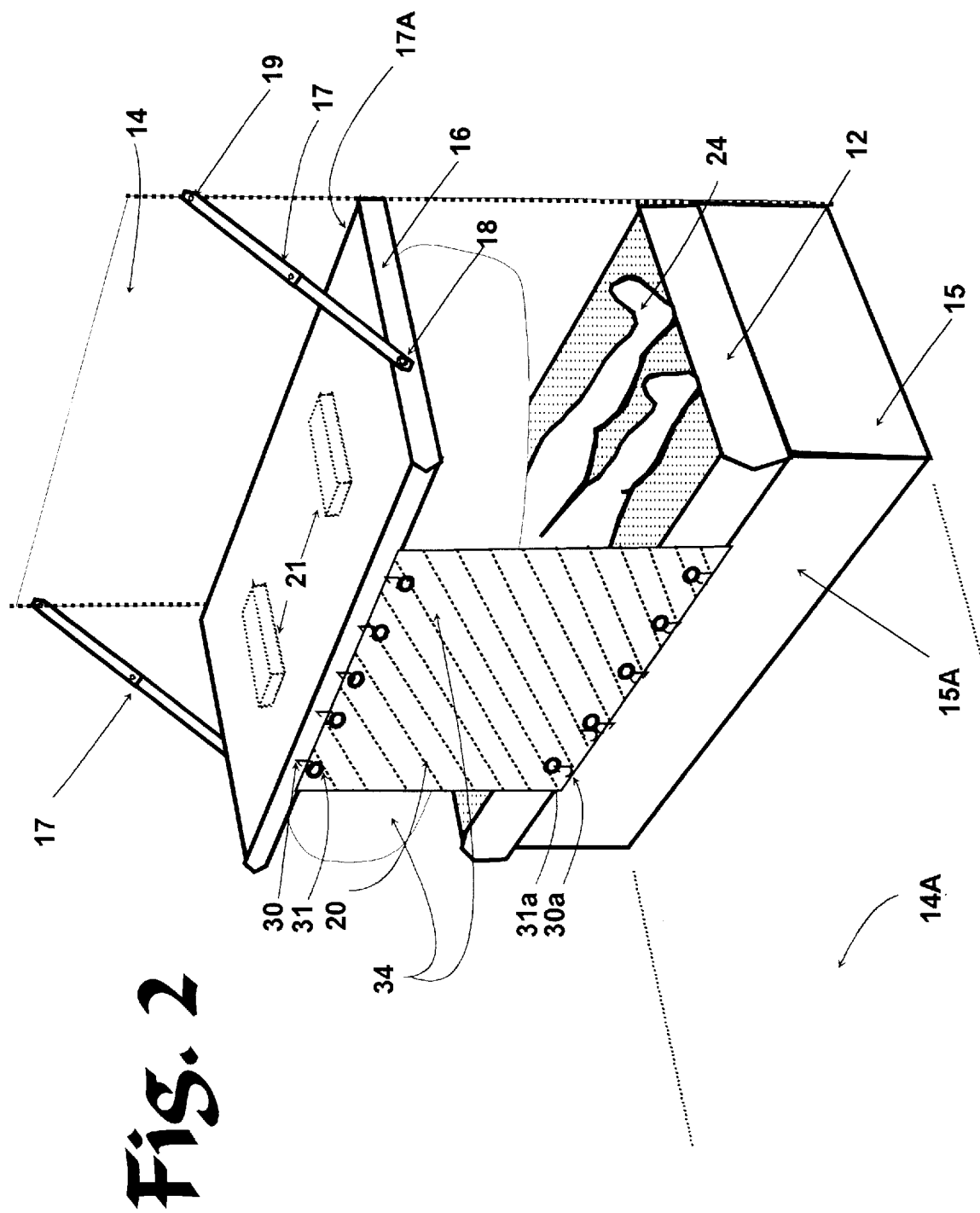

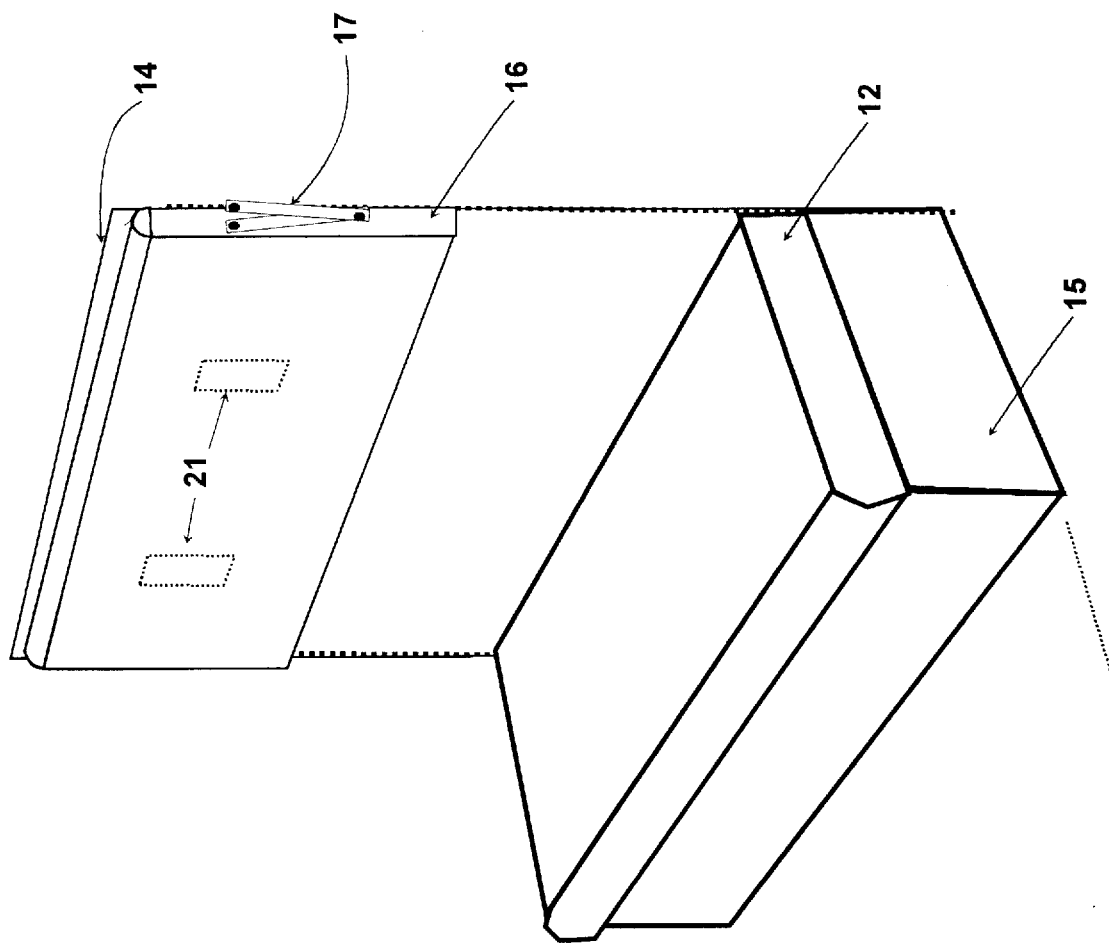

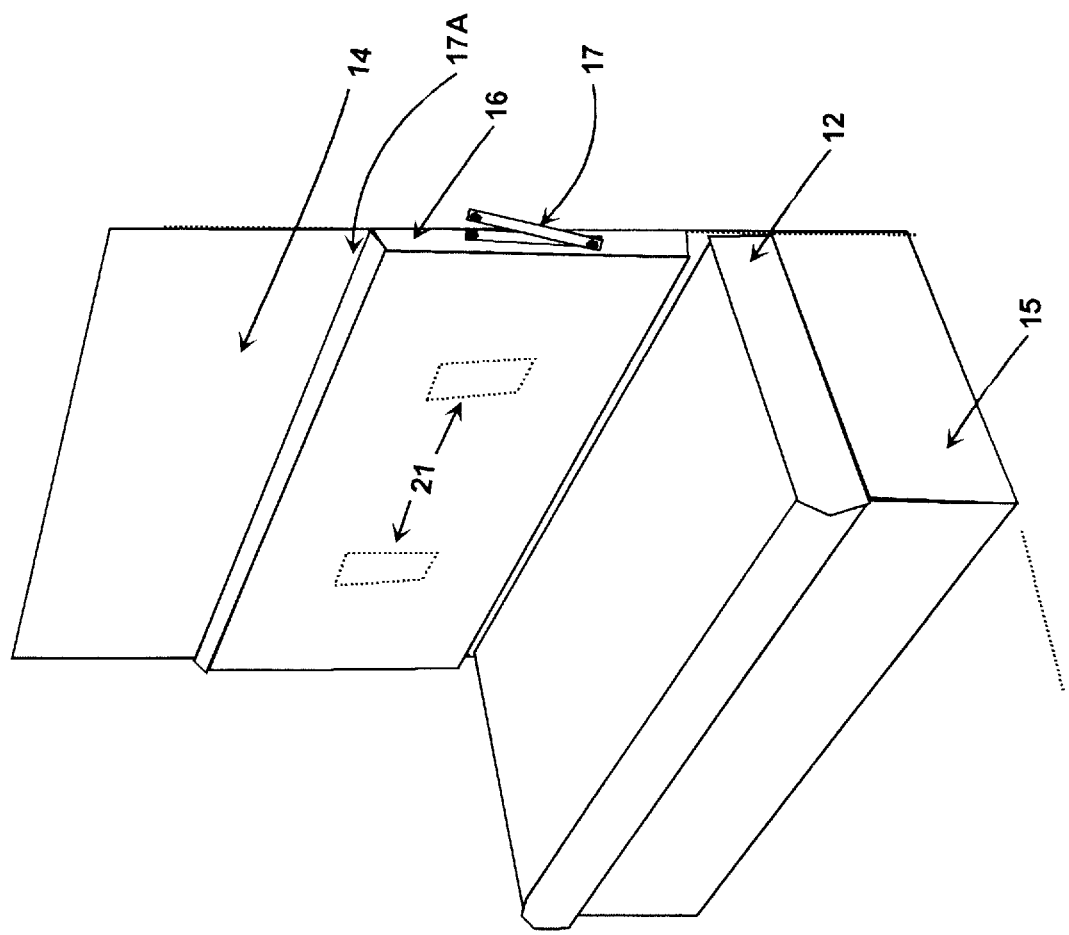

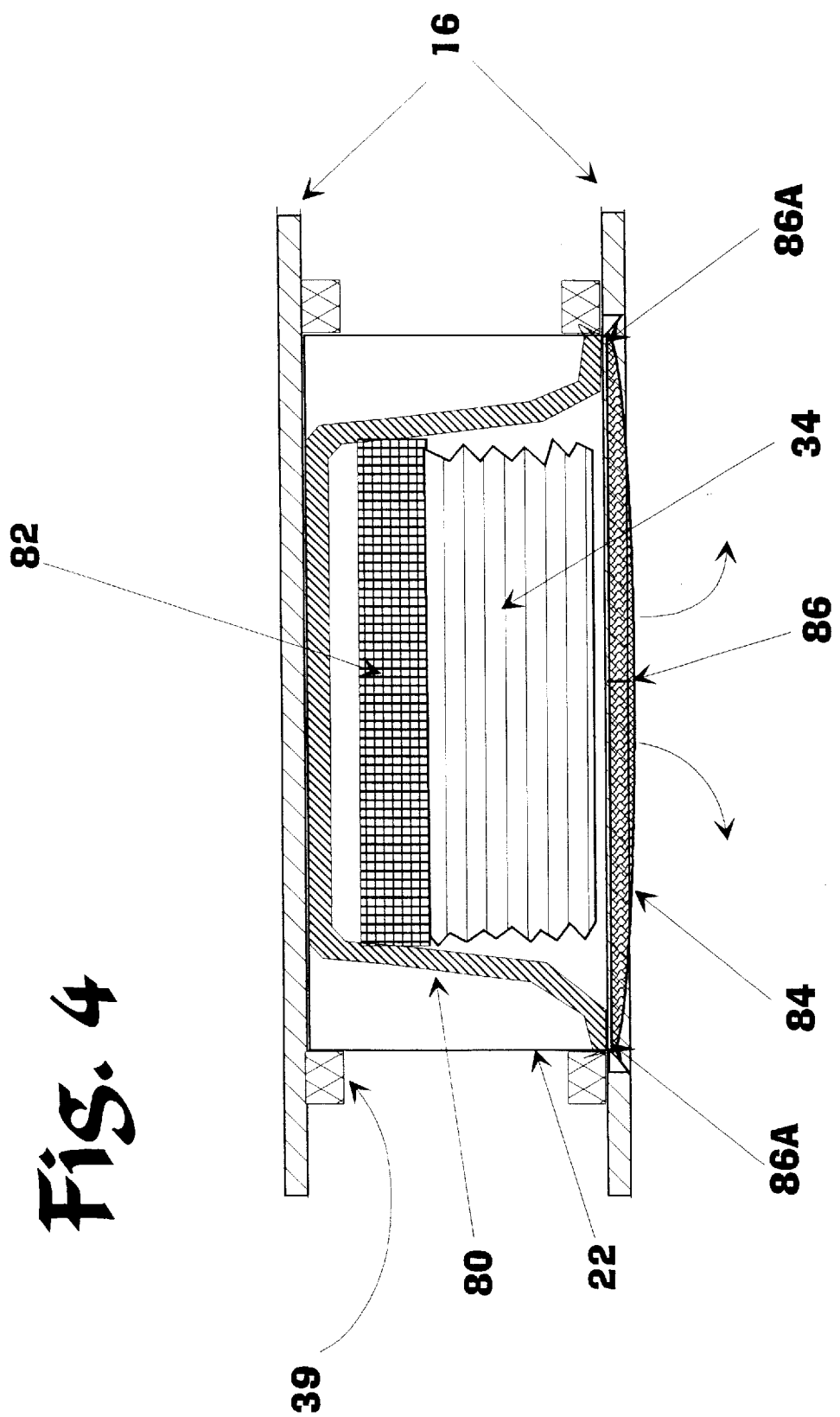

VEHICLE SLEEPER BUNK RESTRAINT SYSTEM

This application is a division of application Ser. No. 08/763,176, filed Dec. 10, 1996, now U.S. Pat. No. 5,690,355.

BACKGROUND AND SUMMARY OF THE INVENTION

Many larger vehicles, such as semi-trailer tractors, motor homes and recreational camping trailers include sleeping compartments where an occupant can recline while another person is driving the vehicle. Current regulations already require restraint systems for this sleeper compartment on trucks for use while the vehicle is moving. The typical system available today utilizes several seat belt assemblies which the reclining occupant must fasten to obtain restraint.

U.S. Pat. Nos. 5,536,042 and 5,375,879 are illustrative of bunk restraints on such larger vehicles which use various types of harnesses or netting fastened around the occupant bunk with various degrees of confinement. These prior systems typically function by restricting the space in which the occupant reclines, or by providing a way of catching the occupant during an emergency situation.

This invention can be implemented in several different embodiments depending on cost goals, sleeper compartment structural and packaging limitations and restraint system performance requirements. A preferred embodiment comprises a fixed, structurally-sound sleeper bunk, securely attached to the cab floor and rear wall. A padded mattress is provided upon which the occupant reclines. Near the front upper edge of this bunk is an attachment system that allows connection of a lower section of a privacy restraint curtain.

Above the bunk, at a distance dependent on cab geometry and desired compartment space, is a shelf-type structure which is hinged at a rear section upon the cab wall, and which pivots downwardly or upwardly to an approximately parallel orientation to the plane of the occupant bunk. This shelf section is approximately the same size as the bunk, and can be locked into position using suitable folding hinge brackets or telescoping supports. An attachment system is located at the front edge of the shelf that allows attachment of an upper portion of the privacy restraint curtain, and, when fastened, increases the vertical strength of the shelf. Similarly, this restraint and privacy curtain can be replaced with a rigid wall section that resides in a pocket of a bunk frame and which can be pulled up by the occupant and attached to the front of the shelf section.

One or more airbags are installed inside the shelf section, which are inflated in response to a signal from a crash sensor. The crash sensor may either be integrated within a frontal crash sensing system or implemented as a separate crash sensing or rollover sensing system. The airbags are deployed when the crash sensor determines that a suitably severe crash or rollover condition has occurred, and deploys by breaking through a lower covering on the shelf to provide a cushioned restraint system about the occupant. The deployed airbags not only restrict occupant movement during a crash or rollover condition but also serve to absorb occupant energy from excessively high occupant velocities.

Should a privacy restraint wall section be used instead of a curtain, this privacy restraint wall section can similarly contain airbags for longitudinal (fore and aft in relation to the vehicle body) occupant restraint protection.

It is an object of this invention to provide a comfortable and easily implemented method for controlling the longitudinal and vertical movement of an occupant in a driven vehicle during an emergency condition such as severe braking, rollover and frontal crash.

It is a further object of this invention to provide a passive bunk restraint system that does not produce excessive restriction of occupant movement during normal use, which requires minimal setup by the occupant and which provides a degree of privacy for the occupant.

It is another object of this invention to provide an inflatable restraint system for the sleeper compartment of a vehicle which, when in an unused condition is stowed to maximize compartment free space.

It is another object of this invention to provide a second sleeping compartment using the shelf assembly as another bunk when the vehicle is stationary.

Many other objects and purposes of the invention will be clear from the following detailed description of the drawings.

BRIEF DESCRIPTION OF THE DRAWINGS

In the drawings:

FIG. 1A is a perspective view of the bunk restraint system of FIG. 1 with the privacy restraint curtain replaced by a privacy restraint wall section.

FIG. 2 is a perspective view of the present invention showing airbags deployed from an upper shelf section protecting a reclined occupant.

FIG. 3 is a perspective view of the present invention in a stowed position.

FIG. 3A is a perspective view of an alternate embodiment of the present invention showing the stowed position of an upwardly pivoting shelf.

FIG. 4 diagrammatically illustrates an air bag module as it would be installed in a shelf section.

DETAILED DESCRIPTION OF THE DRAWINGS

Figure 1:
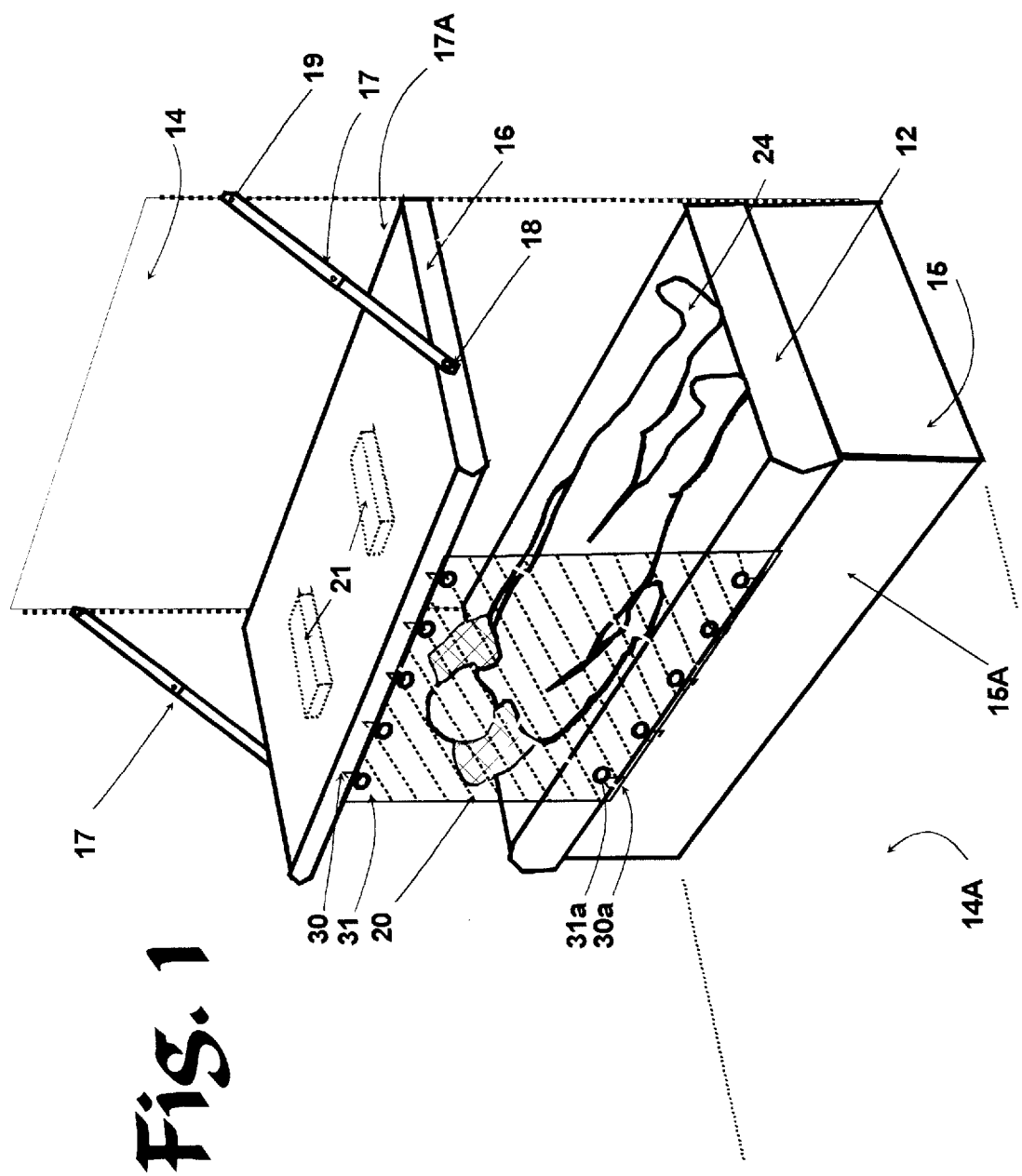
FIG. 1 is a perspective view of the bunk restraint system showing the present invention in the implemented condition with shelf extended and attached to the front privacy restraint curtain.

Reference is now made to FIG. 1 which shows a bunk or bed 12 of the type found in truck sleeper compartments. The bunk includes suitable support sections 15,15A at a height typically between 0.3 and 0.6 meters (one and two feet) from the cab floor 14A. A reclining occupant 24 is also shown. A shelf 16 is extended above the occupant 24 by hinged, folding or telescoping brackets 17 which have a forward end 18 attached to the shelf 16 and a rearward end 19 attached to the rear wall 14 of the cab. The rear section of the shelf 16 is attached to the rear cab wall 14 using a piano-hinge type pivoting support 17A. Attachment clips 30 along the front section of the shelf 16 are located for attachment of the privacy restraint curtain eyelets 31. Similarly, the lower section of the privacy restraint curtain 20 has eyelets 31a for attachment to front bunk clips 30a. The privacy restraint curtain 20 is constructed of a suitably strong fabric such as a coarse mesh (as illustrated) or airbag cushion material to restrain the occupant during rapid deceleration during braking or a crash. Other materials that can be used as a privacy curtain are canvas and nylon. Airbag modules 21 are installed within the shelf assembly 16 and suitably located to provide desired coverage of the occupant 24 when deployed.

Reference is now made to FIG. 1A which shows an alternate embodiment of the invention with the privacy restraint curtain 20 replaced by a privacy restraint wall 35. In this configuration, the forward support structure 15A of the bunk 15 having a top 33a which includes a pocket 37 within which the wall 35 is stored when not in use. After the upper shelf section 16 is pivoted into position (as shown in FIG. 1A), the occupant raises the privacy restraint wall 35 by lifting it to a height where latching means engage the wall 35 securing it in place. This latching means could be provided, for example, by a spring actuated rod on the top 33a of the bunk that is engageable with a socket located on the wall 35. The spring actuated rod is manually releasable from the socket enabling the occupant to reposition the wall 35 within the pocket 37. A spring-loaded assembly including one or more leaf or helical springs 52, may be located inside the pocket 37 to bias the wall 35 upwardly should its weight be high enough to warrant its use. When the latching means is released, the spring 52 shown in phantom line, assists in lifting the wall 35 upwardly. With the privacy wall 35 in its locked, raised position it may optionally be attached to the upper shelf 16 with suitable fasteners. These fasteners can for example be a strap 32 or straps secured (on one side) to one or the other of the wall 35 and the shelf 16 and secured (on its other side) to a hook or to a Velcro patch. These fasteners may alternatively comprise a length of seat belt (seat belt webbing) with a seat belt buckle and tongue to provide another easy and convenient means for securing (and unlatching) the wall 35 to (and from) the shelf 16. The privacy restraint wall 35 may be constructed of suitably padded material to protect the occupant if the occupant should roll into the wall during rapid vehicle deceleration. Optionally, the privacy restraint wall 35 may also include one or more airbag modules 22 which are activated by the main crash sensor system or a separate auxiliary sensing system and deployed when either a frontal crash, rollover or other emergency condition is sensed.

FIG. 4 shows a more detailed view of an airbag module 22 located within the shelf 16. The airbag module 22, as used in the present invention, includes a housing 80, typically of metal or plastic, for supporting an inflator 82 (or gas generator) and an airbag such as 34, which is structurally attached to the framing sections 39 of the shelf 16. The inflator 82 and air bag 34 are diagrammatically illustrated as module construction is well known in the art. A protective cover 84, having a tear seam 86 encloses an opening in a lower surface of the shelf 16. The cover 84 is hinged to the housing or an adjacent structure such as the shelf 16. The above construction is equally applicable to an airbag module installation within the privacy wall 35. As is known in the art, as the airbag inflates the tear seam rips open the cover sections and pivots about its hinges 86A.

FIG. 2 shows the airbags 34 located with the shelf 16 in a deployed condition. The shape, size and inflation characteristics of the airbags are designed for the crash or roll-over conditions of concern, and may range from relatively large cushions providing coverage of most of the bunk space, to smaller cushions that only serve as supplemental padding of the upper bunk area (where the head and upper torso of the occupant would reside). The airbags may be of sufficient size and the inflation characteristics of the inflator and the air leakage characteristics of the air bag may be at a low level to actually hold the occupant in place during a crash or rollover so that secondary occupant impacts with interior cab objects do not occur.

Reference is now made to FIG. 3 and FIG. 3A, which depict the shelf 16 in the stowed condition illustrating an upwardly-pivoting and downwardly-pivoting shelf configuration respectively. This type of arrangement provides very little reduction in cab space due to the presence of the restraint system.

Many other variations and combinations of these components and similar components are included in the scope of this invention. These variations include, for example, using vertical support rods or brackets attached to the bunk support frame or cab floor instead of the hinged folding brackets attached to the rear cab wall to support the shelf assembly. Also, the placements of the privacy wall section or upper shelf assembly are not limited to those conditions illustrated, but may be in a different plane depending on the design of the sleeping compartment. The invention is applicable to all types of vehicles such as trucks, trains, buses, motor homes, recreational vehicles and any other type of motor vehicle which has an occupant or passenger compartment designed or designated for sleeping or reclining.

Many changes and modifications in the above described embodiment of the invention can, of course, be carried out without departing from the scope thereof. Accordingly, that scope is intended to be limited only by the scope of the appended claims.

I claim:

1. A safety restraint system (16,20,35) for use in protecting an occupant (24) within a sleeping compartment of a vehicle, comprising reclining means for providing a bunk or bed (12, 15) upon which the occupant may rest;

a member (16), positioned generally over the reclining means;

inflatable restraint means including at least one airbag, installed in the member, and which is deployable substantially downwardly towards and against the reclining occupant;

a crash or rollover sensing means for generating an activation signal indicative of a crash or impending rollover of the vehicle for activation of the restraint airbags.

2. The system as defined in claim 1 including a manually extendible, vertically-oriented roll restraint means, for prohibiting the reclining occupant from falling out of the bunk during conditions of rapid longitudinal or lateral deceleration.

3. The device as defined in claim 2 wherein the roll restraint means comprises a suitably strong material including a woven airbag cushion fabric, and which is attached proximate the bunk section upon which the occupant reclines and to the member.

4. The device as defined in claim 3 wherein the roll restraint means functions as a privacy curtain for the reclining occupant, and which can be one of, removed, folded, rolled and positioned in a stored condition when not in use.

5. The device as defined in claim 3 wherein the roll restraint means comprises a vertically movable wall section hinged on one end to pivot into stowed position.

6. The device as defined in claim 3 wherein the roll restraint means comprises a vertically movable wall to be stowed substantially vertical within a pocket in a section of the bunk and which is extendible to a raised position to protect the occupant.

7. The device as defined in claim 6 wherein the vertically movable wall is attachable to the member fasteners to provide additional support to either itself or to the member.

8. The device as defined in claim 3 wherein the roll restraint means includes inflatable restraint means deployable in response to an activation signal.

9. A system (16, 20, 35) for protecting an occupant (24) reclining upon a bunk (12) within a sleeping compartment of a vehicle comprising:

a member (16), positioned generally over the reclining occupant;

inflatable restraint means including at least one airbag, installed in the member, and which is deployable substantially downwardly towards the reclining occupant to prevent the occupant from moving from the bunk;

a crash or rollover sensing means for generating an activation signal indicative of a crash or impending rollover of the vehicle for activation of the restraint airbags.

10. The system as defined in claim 9 including a manually extendible, vertically-oriented roll restraint means, for prohibiting the reclining occupant from falling out of the bunk during conditions of rapid longitudinal or lateral deceleration.

11. The device as defined in claim 9 wherein the roll restraint means comprises a suitably strong material including a woven airbag cushion fabric, and which is attached proximate the bunk section upon which the occupant reclines and to the member.

12. The device as defined in claim 10 wherein the roll restraint means functions as a privacy curtain for the reclining occupant, and which can be one of, removed, folded, rolled and positioned in a stored condition when not in use.

13. The device as defined in claim 10 wherein the roll restraint means comprises a vertically movable wall section hinged on one end to pivot into stowed position.

14. The device as defined in claim 10 wherein the roll restraint means comprises a vertically movable wall to be stowed substantially vertically within a pocket in a section of the bunk and which is extendible to a raised position to protect the occupant.

15. The device as defined in claim 14 wherein the vertically movable wall is attachable to the member fasteners to provide additional support to either itself or to the member.

16. The device as defined in claim 9 wherein the roll restraint means includes inflatable restraint means deployable in response to an activation signal.

* * * * *